(12) United States Patent
Jetton

(10) Patent No.: US 6,903,275 B1
(45) Date of Patent: Jun. 7, 2005

(54) MOUNTING DEVICE FOR A WIRE HARNESS SHIELD

(75) Inventor: James Thomas Jetton, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/969,872

(22) Filed: Oct. 22, 2004

(51) Int. Cl.$^7$ .............................. H02G 3/04; F16B 21/07
(52) U.S. Cl. ...................... 174/72 A; 174/48; 174/68.3; 403/329
(58) Field of Search ........................ 174/48, 68.1, 68.3, 174/72 A, 96, 97, 98, 99 R, 101, 135; 403/326, 329

(56) References Cited

U.S. PATENT DOCUMENTS

| | | | |
|---|---|---|---|
| 5,534,665 A | * | 7/1996 | Long ......................... 174/72 A |
| 5,577,779 A | | 11/1996 | Dangel |
| 5,597,980 A | | 1/1997 | Weber |
| 5,628,533 A | | 5/1997 | Hill |
| 5,709,249 A | * | 1/1998 | Okada et al. ............... 174/68.3 |
| 5,962,814 A | | 10/1999 | Skipworth et al. |
| 6,087,593 A | | 7/2000 | Skipworth et al. |
| 6,368,009 B1 | * | 4/2002 | Noda ......................... 403/329 |
| 6,462,276 B2 | * | 10/2002 | Shimizu et al. ............... 174/48 |
| 6,698,966 B2 | * | 3/2004 | Hilton et al. ............... 403/321 |

* cited by examiner

Primary Examiner—Dean A. Reichard
Assistant Examiner—Adolfo Nino
(74) Attorney, Agent, or Firm—Daniel R. Edelbrock

(57) ABSTRACT

A mounting device has a lock component attached to a wire harness shield and a bracket component for attachment to an engine part. The bracket component has two spaced, upright parallel arms defining an opening between them. The arms have free ends extending toward each other and separated by a gap. The lock component has a box-like shape with spaced sides. A deflectable section is formed in a first side. A stem extends from the deflectable section toward a second side of the lock component and through a slot in the second side. A push element is formed on an end of the stem extending from the slot. Latches or ledges are formed on ramp-shaped protrusions formed on the deflectable section on each side of the stem. When the lock component receives the parallel arms of the bracket component, the free ends of the arms act on the protrusions to force the deflectable section outward until the ledges snap beneath the free ends of the arms. To release the mounting device, pressing force on the push element moves the ledges from beneath the arms, and the lock component can be lifted from the bracket component.

20 Claims, 4 Drawing Sheets

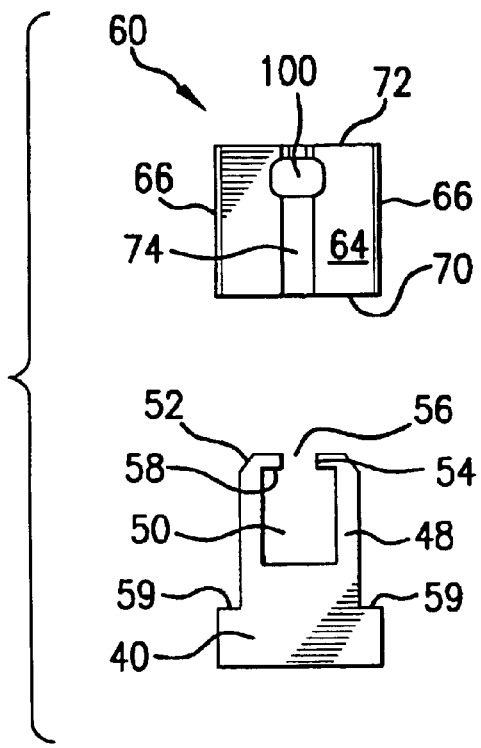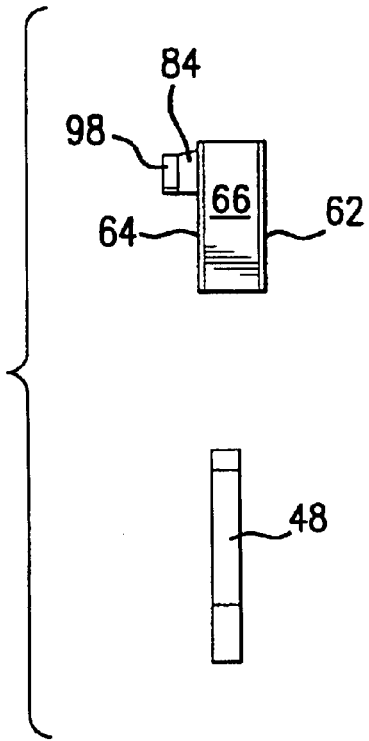
FIG.3  FIG.4
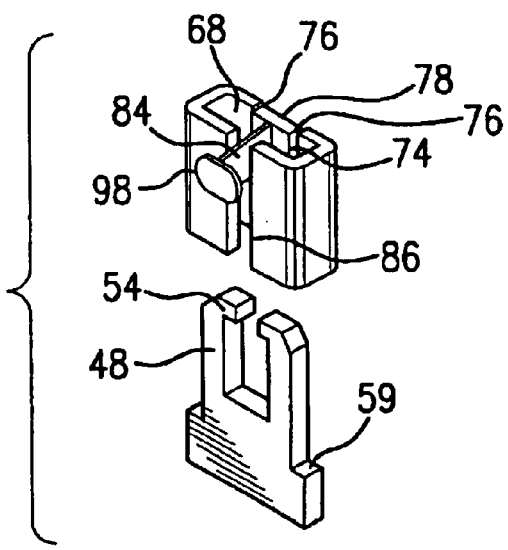
FIG.5

# MOUNTING DEVICE FOR A WIRE HARNESS SHIELD

BACKGROUND OF THE INVENTION

1. Field of the Invention

The invention relates in general to the securing of wire harness shields and more specifically to a releasable device for reliably mounting a wire harness shield to an engine part in a vehicle.

2. Discussion of Related Art

Wire harness shields help maintain the dependability of the circuits and electrical connections within a wire harness. Providing a wire harness with a shield shelters the harness from environmental hazards within an engine compartment of a vehicle. These hazards could include moisture, grime and heat. Using the shield to secure a portion of the wire harness in a fixed position can safeguard the harness from damage caused by vehicle movement and vibration. The shields often need to be securely attached to a vehicle panel or engine part to furnish this protection.

U.S. Pat. No. 5,597,980 discloses a mounting mechanism for securing a wire harness cover to a fuel injector rail. The mounting mechanism includes a locking structure attached to a base of a wire harness cover. The locking structure has a pivoting lever biased in a lock position. A projection on the lever is received in an aperture of a mounting tab extending from a fuel rail to lock the cover on the fuel rail. If the wire harness is within the cover, to release the locking structure an operator has to grasp a handle extending from the lever between two fingers and pull the handle away from the rest of the locking structure. The lever is thereby pivoted to a release position, removing the projection from the mounting tab aperture. The wire harness cover can then be pulled away from the mounting tab and fuel rail. This becomes more time consuming and awkward to manage as longer wire harness covers require multiple locking structures. The handle is also difficult to find since the mounting mechanism is located beneath the cover. The handle therefore needs to be specially shaped to allow the operator to identify it by feel.

Relatively complex locking structures having simpler intended operation are also known in the art. For example, FIG. 1 illustrates a shroud 10 for receiving and protecting an electrical relay (not shown). An electrical connector 12 attached to a wire harness electrically connects the relay into a circuit within the wire harness. The lock structure comprises a stationary catch 14 on the shroud. A lever comprising split portions 16 is pivotally mounted on the connector. When the shroud is fit over the relay and connector, the catch forces the lever outward until the catch is under inner ridges of the lever split portions 16. Then the lever snaps back over the catch and the shroud is secured on the connector. Pushing the lever inward spreads the ridges beyond a periphery of the catch and thereby releases the catch, allowing the shroud and relay to be disconnected from the connector. This particular locking structure doesn't work very well in practice, often requiring a lot of force to separate the lever split portions and two-handed operation to separate the shroud and connector. There seems to be a clear need in the art for an inexpensive, easy-to-operate mounting structure that reliably secures a wire harness shield within an engine compartment of a vehicle.

SUMMARY OF THE INVENTION

Accordingly, it is an object of this invention to provide a reliable, reusable device for mounting a wire harness shield to a vehicle panel or engine part.

Another object of the invention is to accomplish the release function with a small pushing force on an easily accessible element of the mounting device.

A further object of the invention is to design lock and bracket components of the device to be simple and inexpensive to manufacture.

In carrying out this invention in the illustrative embodiment thereof, a mounting device has two members comprising a bracket component and a lock component. The bracket component has the capability of being attached to an engine part or vehicle body panel. Two upright, parallel arms define a center opening. The arms turn toward each other at their free ends, but remain separated by a gap leading to the opening. The undersides of the arms at this location form two catch surfaces facing the opening, one on each side of the gap.

The lock component is molded together with the wire harness shield. The lock component is shaped as a rectangular block or box open at each end. A first side of the box is integral with a side of the shield and has two slits providing a deflectable segment or section. A stem extends from the deflectable section toward and though a slot in a second side of the box. A push element on a free end of the stem outside the box enables manual flexing or shifting of the deflectable section. A protrusion on an inner face of the deflectable section projects into an interior of the box. The protrusion partially surrounds the stem and provides inclined or ramped surfaces for automatic pivoting or shifting of the deflectable section and a ledge on each side of the stem.

The lock component receives the two bracket arms. The free ends of the arms act on the ramp surfaces to mechanically pivot the deflectable section outward from the box while the stem passes through the gap. When the protrusion is within the opening, the deflectable section snaps back and the ledges lodge beneath the undersides of the bracket arms. Manual force on the push element will flex the deflectable section outward again, separating the ledges from the bracket arm undersides and enabling removal of the lock component from the bracket component.

BRIEF DESCRIPTION OF THE DRAWINGS

This invention, together with other objects, features, aspects and advantages thereof, will be more clearly understood from the following description, considered in conjunction with the accompanying drawings.

FIG. 3 is a front view of the lock and bracket components according to the present invention.

FIG. 4 is a side view of the lock and bracket components, juxtaposed with FIG. 3.

FIG. 5 is a perspective view of the lock component and bracket component prior to assembly.

DETAILED DESCRIPTION OF THE ILLUSTRATED EMBODIMENT

Figure 1:
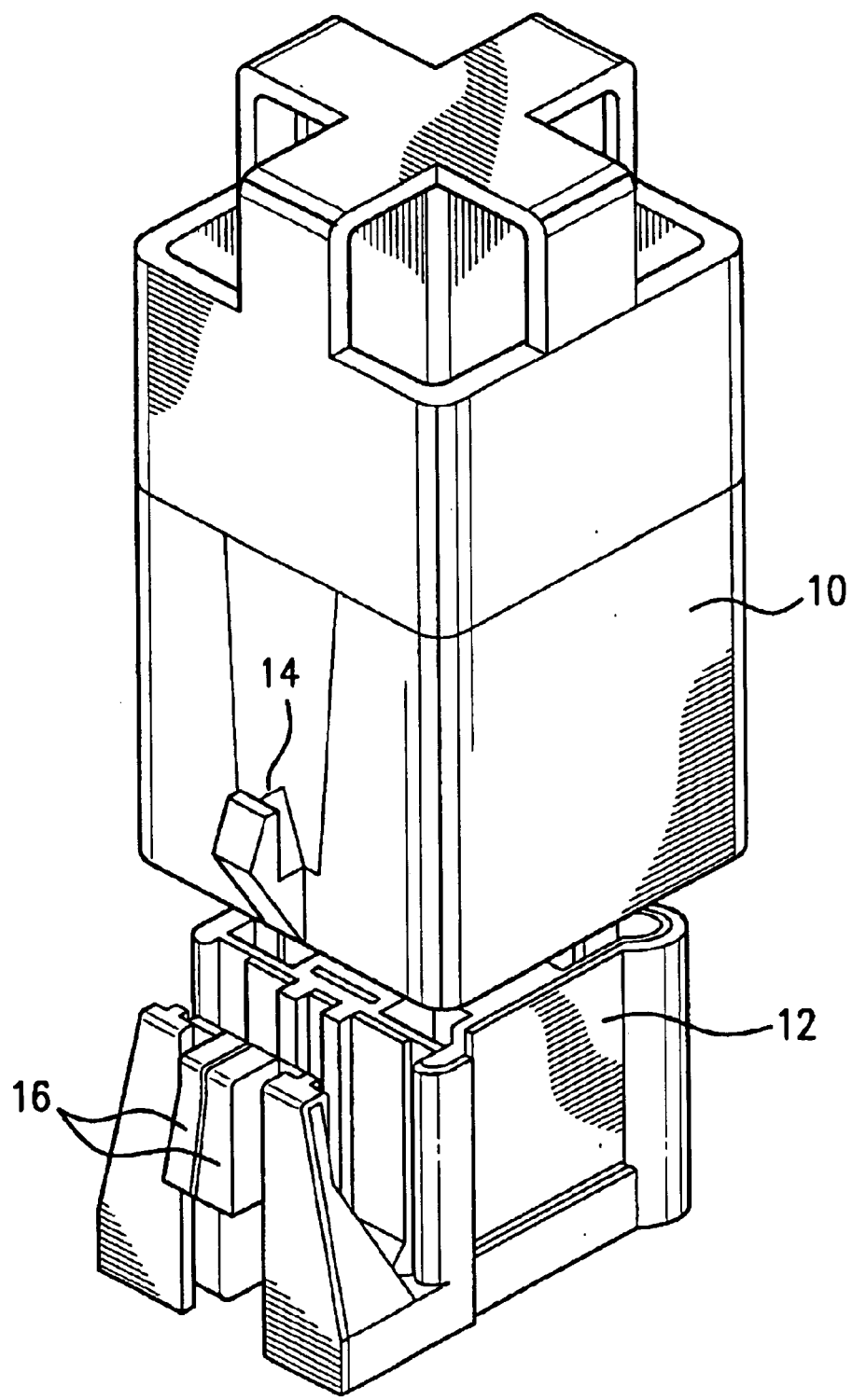
FIG. 1 is a perspective view of a prior art locking device.
Figure 2:
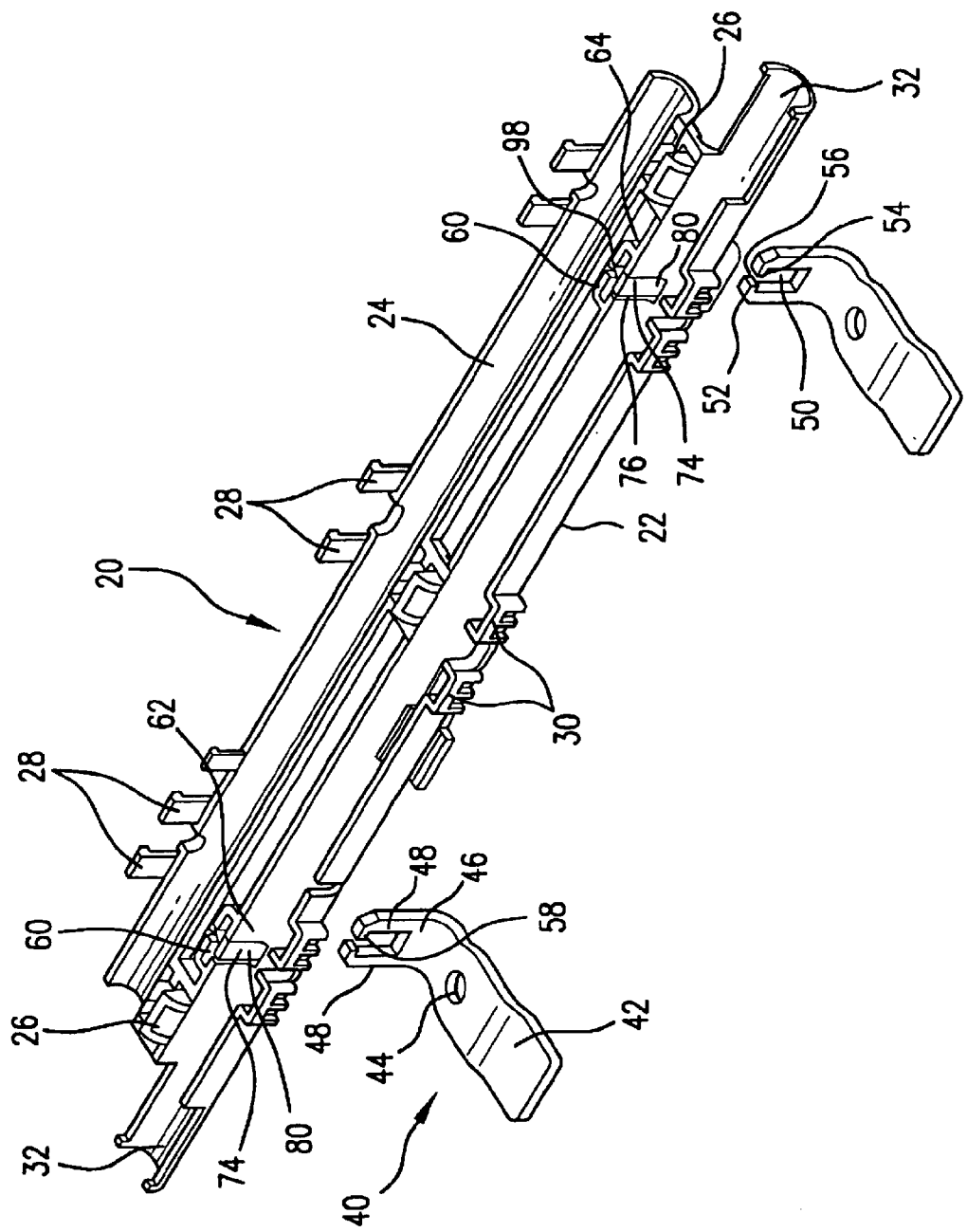
FIG. 2 is a perspective view of a wire harness shield with a mounting device according to the present invention, showing lock components prior to assembly on bracket components.

Referring now to FIG. 2, a wire harness shield 20 has a base 22 into which a wire harness can be laid. A lid 24 is attached to the base by hinges 26. Latch tabs 28 are received in complimentary locking frames 30 when the lid is pivoted to a closed position on the base, securing and protecting the harness in the shield. Fastening provisions 32 enable the harness to be taped to the shield to stabilize the assembly.

The shield 20 needs to be secured to an engine or vehicle part in the engine compartment, such as an intake manifold, fuel rail or body panel, to prevent damage to the harness. A mounting device according to the present invention comprises a first component in the form of a bracket 40. The bracket component, in FIG. 2, is illustrated as being L-shaped with an optional, long rectangular leg 42 having an aperture 44. A bolt, screw or other type of fastener can be inserted through the aperture 44 to attach the bracket to the engine part. A shorter leg 46 of the bracket extends perpendicular from the leg 42 and has two upright arms 48 spaced apart to provide a central opening 50. The arms 48 each have a free end 52 distal from the juncture of the legs 42 and 46. The free ends 52 each have a projection 54. The projections 54, as more clearly illustrated in FIG. 3, extend toward each other, forming a narrower gap 56 leading to the wider opening 50. The projections have undersides 58 facing the opening and forming twin catches. The projections are essentially the free ends of the bracket arms turned to face each other. The bracket, for example, would be stamped and bent from a heat-resistant metal such as steel.

A second component of the mounting device comprises a lock 60 integrally molded to the shield on the hinge side of the base 22. The lock component 60, in combination with a modified bracket component 40, is depicted more visibly in FIGS. 3–7. The bracket component does not have to include the fastening leg 42 and bolt aperture 44. These features are not part of the lock operation. The bracket can be attached in other ways to the vehicle part, such as by adhesive or by being formed integrally with the part. In this case, the bracket would be provided with a stop or shelf 59 at the outside of each arm 48 upon which the lock component would rest or abut against when completely installed on the bracket component to prevent excessive movement. In the FIG. 2 version of the bracket, the bend at the juncture of the long leg 42 and the shorter leg 46 of the bracket would serve this stop purpose.

The lock component 60 is configured generally in a rectangular box shape, with a first side 62 and a second, parallel side 64 spaced from the first side. The first and second sides are connected by relatively short right-angle walls 66, forming a lock component interior 68. The box shape of the lock component is open at both a bracket arm insertion end 70 and an opposite, lock-operation end 72. The first side 62 of the lock component is illustrated in FIG. 2 as being an integral part of a side of the shield base. The lock component is molded with the wire harness shield from a suitable, electrically non-conductive plastic such as Nylon.

A resilient or deflectable appendage or section 74 is formed in the first side 62 by parallel slits 76 (best shown in FIGS. 2 and 5) extending across the side from the lock-operation end 72 toward, but ending short of, the insertion end 70. In other words, the deflectable section is integral with the first side 62 with a free end 78 at the lock-operation end 72 of the lock component and an end 80 integrally joined to the first side adjacent the bracket arm insertion end 70 of the lock component. The deflectable section 74 can thereby be deflected outward from the plane of the first side, away from the interior 68 of the lock component. The deflectable section 74 has an inner face 82 (FIG. 7) facing the interior of the lock component.

Figures 6, 7:
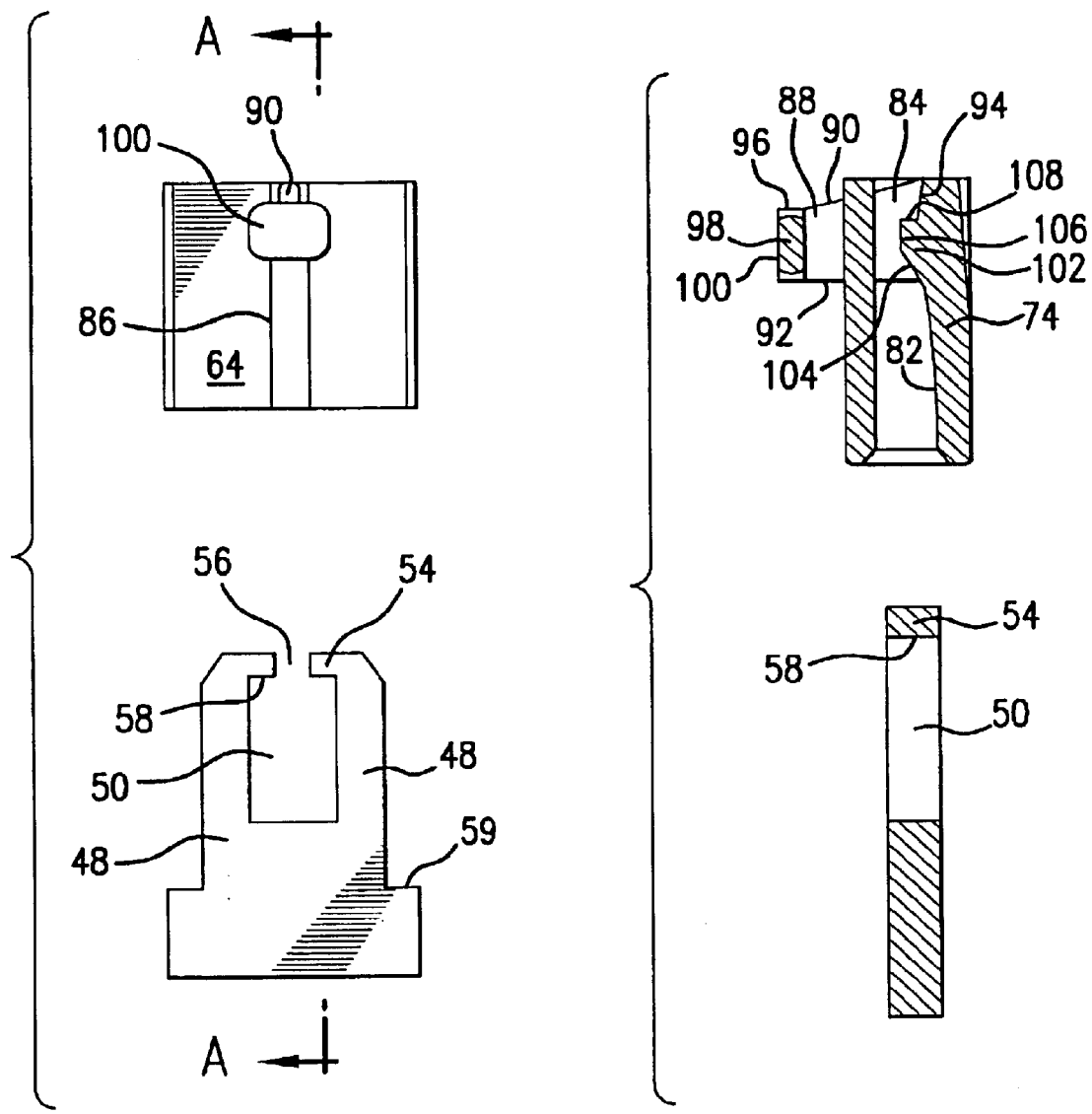
FIG. 6 is an enlarged front view of the lock and bracket components.
FIG. 7 is a cross-sectional side view of the lock and bracket components taken along section line A—A of FIG. 6.

An outcrop or stem 84, most visible in FIGS. 5 and 7, is cantilevered from the inner face 82 of the deflectable section 74. The stem 84 is integral with the deflectable section and has a thin cross-section to allow it to pass through a slot 86 created in the second side 64 of the lock component. The slot 86 extends the entire length of the second side 64, dividing the second side into two segments. The stem is also narrow enough to enter the gap 56 formed between the projections 54 of the bracket arms 48. The stem has relatively broad side surfaces 88 to provide strength. The side surfaces 88 meet at a top surface 90 inclined downward past the slot and a bottom surface 92 extending at a right angle from the deflectable section. A first end 94 of the stem is integral with the deflectable section and a second, free end 96 extends outward from the interior 68 of the lock component and past the second side 64 a predetermined distance. A push button or element 98 is formed on the free end 96 of the stem. The plane of the push element 98 is perpendicular to the plane of the stem, and the push element has a large contact face 100 for ease of operation, so the push element cannot be forced through the slot 86.

As best illustrated in the cross-section view of FIG. 7, on each side of the stem 84, also integral with the inner face 82 of the deflectable section 74, is a bulge or protrusion 102. Each protrusion has a ramp surface 104 inclined outward and upward from the inner face, leading to a straight portion 106 that forms a ledge 108 extending perpendicularly from the deflectable section adjacent the free end 78 of the section. The ledges 108 provide a latch surface at each side surface 88 of the stem approximately midway along the stem side surface. The bulges or protrusions 102 can alternatively be viewed as a single bulge or protrusion partially surrounding the stem and forming latch surfaces on each side of the stem.

In operation, the wire harness shield 20 is positioned such that the lock components 60 line up with the legs 46 of the bracket components 40. At each mounting device, the bracket arms 48 enter the interior 68 between the lock component sides 62 and 64 at insertion end 70. The free ends 52 and projections 54 of the bracket arms slide along the ramp surfaces 104 of the protrusions 102 on each side of the stem 84 of the deflectable section 74. This automatically stresses or forces the deflectable section from a first, at-rest position outward relative to the interior 68 and the plane of the first side 62 of the lock component. When the projections 54 pass the straight portions 106, the deflectable section snaps from a second, deflected state or position back into alignment with the side 62. The latch surfaces or ledges 108 move under the catch surfaces or undersides 58 of the projections 54, securing each lock component on each bracket component and the wire harness shield to the engine compartment part.

To release the shield from the engine part, a small force is applied on the push element 98 of each mounting device, for example by pressing a finger against the contact face 100. This pushing force, acting through the stem 84, again forces the deflectable section 74 outward, sliding the ledges 108 from beneath the projections 54 of the bracket arms 48. The predetermined distance that the stem 84 protrudes from the slot 86 keeps the push element 98 from contacting the second side 64 of the lock component, at least until the ledges 108 are separated from the projections 54. The lock components can then be lifted off the bracket components.

The twin latches formed by the ledges on each side of the lock component stem and the twin catches or undersides of the bracket arms provide a reliable, secure mounting of the wire harness shield on the vehicle part. The location of the lock component on a side of the shield, rather than under a base of the shield, in combination with the push element on the end of the stem provides easy access to and operation of the mounting device. The simple design requires only a small force, capable of being applied by an assembler's finger, to release the lock component from the bracket component. This makes separation of the shield from the vehicle part quick and easy when, for example, engine service is required. Since the lock component is molded as part of the shield only the bracket component has to be tracked as a separate piece. The uncomplicated design provides for inexpensive manufacture of the mounting device. The mounting device could also be used to secure other types of parts together in other environments.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A mounting device for securing one part to another part, the mounting device comprising:
    a bracket including two surfaces facing in a first direction; and
    a lock including a deflectable appendage, the appendage including an element upon which force is applied to deflect the appendage, the appendage further including a protrusion, the protrusion including two surfaces facing in a second direction directly opposite the first direction when the lock and bracket are functionally aligned, the two surfaces of the protrusion being located on opposite sides of the element.

2. The mounting device of claim 1 further comprising complimentary contact features on the bracket and protrusion for automatically deflecting the appendage from a first, at-rest position to a second position as the lock is set on the bracket.

3. The mounting device of claim 2 further comprising an opening on the bracket, the opening located such that the opening receives the protrusion when the lock is completely installed on the bracket, whereby the appendage moves back to the first position and the two surfaces of the protrusion catch against the two surfaces of the bracket.

4. A lock comprising:
    a first component having two arms surrounding an opening, the arms forming two catch surfaces facing the opening; and
    a second component having a resilient section, an outcrop extending from the resilient section, a portion of the outcrop being sized to pass between the arms into the opening, and a bulge in the resilient section forming latch surfaces on each side of the outcrop, wherein the latch surfaces are positioned on the bulge to engage the catch surfaces of the arms when the resilient section is not stressed.

5. The lock of claim 4 further comprising a push element on the outcrop that enables a force to be applied to deflect the resilient section to a state wherein the latch surfaces do not engage the catch surfaces.

6. The lock of claim 4 further comprising means on the arms and bulge for mechanically deflecting the resilient section as the second component is placed on the first component until the bulge in the resilient section enters the opening.

7. The lock of claim 4 further comprising a shelf on the first component against which the second component rests when the latch and catch surfaces are engaged.

8. A device for fastening a wire harness shield within an engine compartment comprising:
    a bracket component for attachment to an engine compartment part, the bracket including two generally parallel arms surrounding a central opening, the arms having free ends extending toward each other to form a gap leading to the opening; and
    a lock component for attachment to the shield, the lock component having first and second spaced sides, the first side including a deflectable section, a ledge formed on an inner face of the deflectable section, a stem extending from adjacent the ledge through a slot in the second side, and a push element on an end of the stem distal from the ledge, wherein when the bracket arms are received between the sides and the stem passes through the gap, the free ends of the arms act on the ledge to force the deflectable section outward until the ledge enters the opening and snaps beneath the free ends of the arms, securing the lock component to the bracket component.

9. The device of claim 8 wherein the ledge includes a ramped surface such that the free ends of the bracket arms engage and slide along the ramped surface to force the deflectable section outward.

10. The device of claim 9 wherein there is a ramped surface leading to a ledge on each side of the stem.

11. The device of claim 8 wherein the lock component is box-shaped with two walls connecting the first and second spaced sides, an insertion end for receiving the parallel arms of the bracket component, and an opposite end where the stem and push element are positioned.

12. The device of claim 11 wherein the deflectable section has a free end at the opposite end of the lock component, the ledge, stem and push element extending from adjacent the free end.

13. The device of claim 12 wherein the deflectable section is formed by two spaced slits in the first side of the lock component, the spaced slits extending from the opposite end of the lock component to a position adjacent the insertion end.

14. The device of claim 8 wherein the first side of the lock component and the deflectable section are integral with the shield.

15. The device of claim 8 wherein the stem splits the ledge into two portions on each side of the stem.

16. The device of claim 15 wherein each portion of the ledge has a ramped surface extending to a latch surface perpendicular to the first side of the lock component.

17. The device of claim 16 wherein an underside of each free end of the bracket arms provides a catch surface for contacting each latch surface of the ledges.

18. The device of claim 8 wherein the push element is wider than the slot and extends perpendicular to the stem.

19. The device of claim 8 wherein the bracket component further includes a leg with an aperture for fastening the bracket component to the engine compartment part.

20. The device of claim 8 wherein the bracket component further includes a stop for limiting movement of the lock component relative to the bracket component when the lock component is secured to the bracket component.

* * * * *